Oct. 24, 1961        J. W. HARRISON        3,005,542

METHOD OF PACKAGING ANNULAR SHAPED ARTICLES

Filed Oct. 10, 1960        3 Sheets—Sheet 1

INVENTOR

JOHN W. HARRISON

BY *Cushman, Darby & Cushman*

ATTORNEYS

Oct. 24, 1961  J. W. HARRISON  3,005,542
METHOD OF PACKAGING ANNULAR SHAPED ARTICLES
Filed Oct. 10, 1960
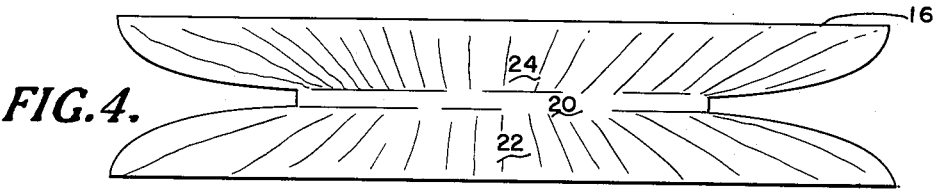
FIG. 4.
FIG. 8.
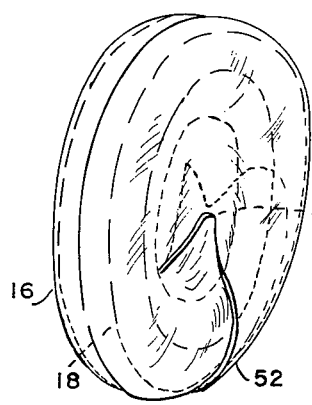
FIG. 5.
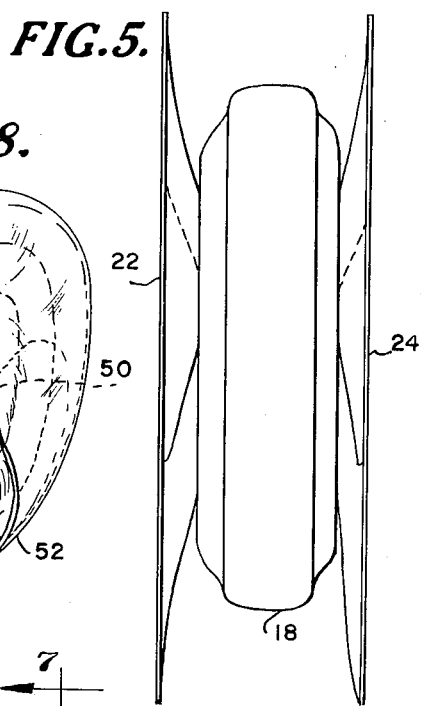
FIG. 7.
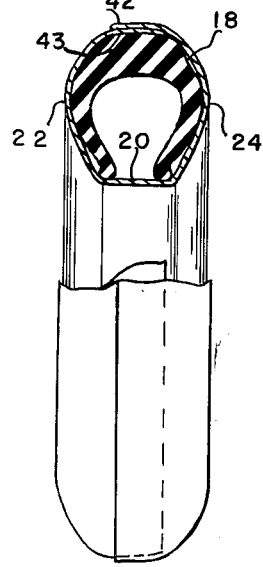
FIG. 6.
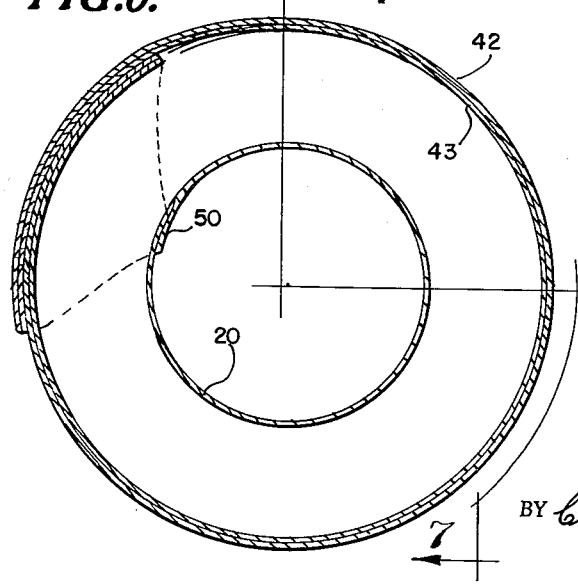
INVENTOR
JOHN W. HARRISON
BY Cushman, Darby & Cushman
ATTORNEYS Oct. 24, 1961  J. W. HARRISON  3,005,542
METHOD OF PACKAGING ANNULAR SHAPED ARTICLES
Filed Oct. 10, 1960  3 Sheets-Sheet 3

INVENTOR
JOHN W. HARRISON
BY Cushman, Darby & Cushman
ATTORNEYS

United States Patent Office 3,005,542
Patented Oct. 24, 1961

3,005,542
METHOD OF PACKAGING ANNULAR SHAPED ARTICLES
John W. Harrison, Winchester, Mass., assignor to W. R. Grace & Co., Cambridge, Mass., a corporation of Connecticut
Filed Oct. 10, 1960, Ser. No. 61,741
31 Claims. (Cl. 206—46)

The present invention relates to a new and improved method of packaging annular shaped articles as well as the novel package produced thereby. More specifically, the present invention relates to a method of wrapping vehicle tires with a heat shrinkable film as well as the improved package resulting therefrom.

The present application is a continuation-in-part application of my copending application, Serial No. 854,684, filed November 27, 1959, now abandoned.

Heretofore, vehicle tires and the like have been wrapped at the manufacturer's plant by utilizing thin strips of paper spirally wrapped around the tire in overlapping relationship. It has been necessary to use relatively narrow strips of paper because the outer diameter of a tire is about double the inner diameter and larger width paper would not be feasible as the overlap would be too great on the smaller diameter. In other words, the present practice is to use a spiral wrap comprising a narrow strip of paper having a large overlap on the inside and a small overlap on the outside. The purpose of providing a wrapping on tires is to protect the tires from dirt and grease damage during storage and shipping to the retailer.

Although such wrappers have been used in the past, they have been found not to be completely satisfactory due to breakage of the paper strips or the sifting of dust between the overlaps of the strips. Of course, the overlaps are not sealed and air can contact the tire and a certain amount of dryrotting will occur because of oxidation if the tire remains on the retailer's shelf for any length of time. In this latter instance, it will be recognized that white side wall tires prior to wrapping with a paper strip have to be coated so that the white surface of the side wall was properly protected. When the retailer sold the tire, it was necessary for him to scrub the wall to remove the coating if he wanted to give special service to the customer. Otherwise, the customer has to go to the trouble of removing the protective coat.

An important object of the present invention is to develop a method of wrapping annular shaped articles to produce a package which substantially protects the article from dirt, dust, grease or the like.

Another object of the present invention is to provide an improved method of packaging a vehicle tire, the method producing a package which is substantially airtight and protects the tire from oxidative damage.

Still another important object of the present invention is to provide a package for a tire wherein it is not necessary to coat the walls of the tire and the tire may be immediately ready for use when placed upon a vehicle.

A further object of the present invention is to package a tire in a heat shrinkable material which is transparent and thus produces a very decorative and appealing appearance to the customer. In this respect, white wall tires wrapped by the improved method of the present invention do not have to be coated and will give a very appealing appearance through the wrapping to the customer.

Still a further object of the present invention is to provide a package for a tire which is stronger and more durable than wrapping heretofore used and, therefore, will not demand as careful handling when being shipped from the manufacturer to the retailer.

Still another object of the present invention is to provide a wrapping for a vehicle tire which will give the tire longer shelf life than tires heretofore have had.

These and other objects and advantages of the present invention will appear more fully in the following specification, claims and drawings in which:

FIGURE 4 is a plan view of a piece of heat shrinkable film showing how it would look if it was layed out on a flat surface;

FIGURE 5 is an end elevational view showing the piece of film in FIGURE 4 being positioned on the inner bead of the tire and prior to overlapping on the outer periphery;

FIGURE 6 is a vertical sectional view through the completed package of the present invention, the tire being shown in elevation;

FIGURE 7 is a view taken on the line 7—7 of FIGURE 6;

FIGURE 8 is a perspective view of the package made in accordance with the present invention;

Figure 1:
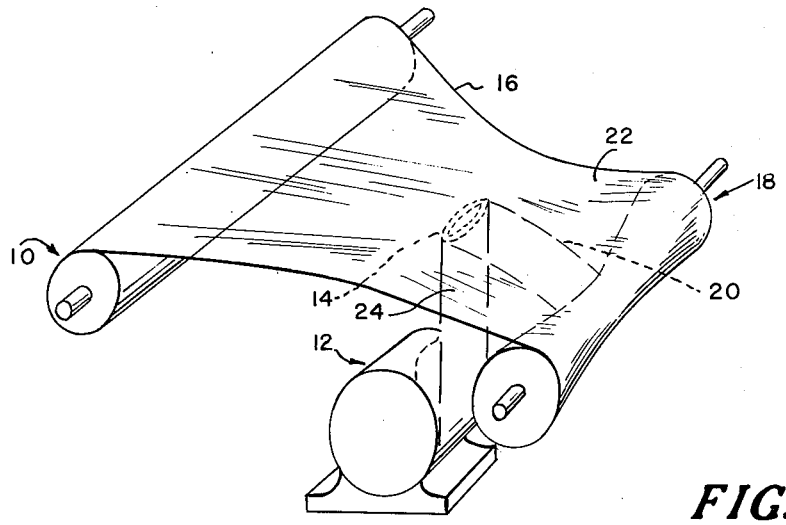
FIGURE 1 is a perspective view disclosing schematically an apparatus for preparing the heat shrinkable film by selectively preshrinking a longitudinal center strip of the same.

Referring to the drawings wherein like character or reference numerals represent like or similar parts, a supply roll 10 of a heat shrinkable film is fed over a hot air blower 12 having a discharge orifice 14. The film 16 is then wound onto a take-off roll 18 after its longitudinal center portion is selectively shrunk as indicated at 20. In more detail, the method contemplated by the present invention requires that the heat shrinkable film be preliminarily shrunk along its longitudinal center axis in a range of about ⅓ to ½ of its original length. The orifice 14 directs the hot air in a localized area so that the shrinkage is along the center of the film 16 whereas the outer edge portions 22 and 24 remain unshrunk. It is preferable to prevent transverse shrinking in the area 20 while permitting only longitudinal shrinking in the range heretofore mentioned. In order to prevent most of the transverse shrinking of the film, a textile overfed center frame can be used.

The heat shrinking film 16 is preferably a biaxially oriented polyethylene having a shrinking energy of 250 p.s.i at 96° C. The biaxially oriented polyethylene having been prepared by irradiating Alathon 14 (polyethylene, molecular weight about 20,000, density 0.916) to a dosage of 12 megarad and then stretching 350° in both directions.

In general, however, there is employed in the invention polyethylene film or tubing which has been irradiated to an extent of 2 to 100 megarad, preferably, 6 to 20 megarad. The irradiation can be accomplished in conventional fashion, e.g. by the use of a high voltage resonant transformer, such as the 2,000,000 volt General Electric resonant transformer, or high energy particle generators of 50,000 to 50,000,000 volts or a Van de Graaff electron generator. In addition to the use of electrons, there can be employed beta rays, gamma rays, e.g. by employing cobalt 60, etc. There can be employed any of the irradiation procedures disclosed in Baird application, Serial No. 713,848, filed February 7, 1958, or Rainer Patent 2,877,500, for example. The entire disclosure of the Baird application and the Rainer patent is hereby incorporated by reference.

The biaxial orientation is normally carried out to an extent of 100 to 700% longitudinally and 100 to 900% laterally. The biaxial stretching can be carried out by blowing irradiated polyethylene tubing as disclosed in the Baird application. The irradiated biaxially oriented polyethylene prepared by such a procedure has a high shrink energy, e.g. 100 to 500 p.s.i. at 96° C.

There can be employed as the starting polyethylene for the irradiation procedure high, low or medium density polyethylene prepared by low or high pressure techniques. The starting polyethylene can have a molecular weight of 7,000 or 12,000 or 19,000 or 21,000 or 24,000 or 35,000 or even higher.

In place of the irradiated polyethylene, there can be employed other heat shrinkable materials such as a film of irradiated or non-irradiated polypropylene or a film of normally crystalline vinylidene chloride polymer and more specifically, vinylidene chloride-vinyl chloride copolymer known commercially as "Saran."

Biaxially oriented irradiated polyethylene is not completely impervious to air but is impervious to dust and grease. A film of biaxially oriented irradiated polyethylene may be made impervious to air by providing it with an integrated coating of a normally crystalline vinylidene chloride polymer and more specifically, a coating of vinylidene chloride-acrylonitrile copolymer. An airtight package may be made in accordance with the present invention by using either a film of normally crystalline vinylidene chloride polymer by itself or a film of biaxially oriented irradiated polyethylene having an integrated coating of a normally crystalline vinylidene chloride polymer.

When the biaxially oriented irradiated polyethylene is provided with an integrated coating, the method of coating the film may be that shown in the United States application for Letters Patent of Theodore Keller, serially numbered 523,024, filed July 19, 1955, or the William G. Baird, Colombian Patent 8,767. The disclosure of the Keller application as well as the Baird patent is incorporated by reference for this purpose.

Figure 2:
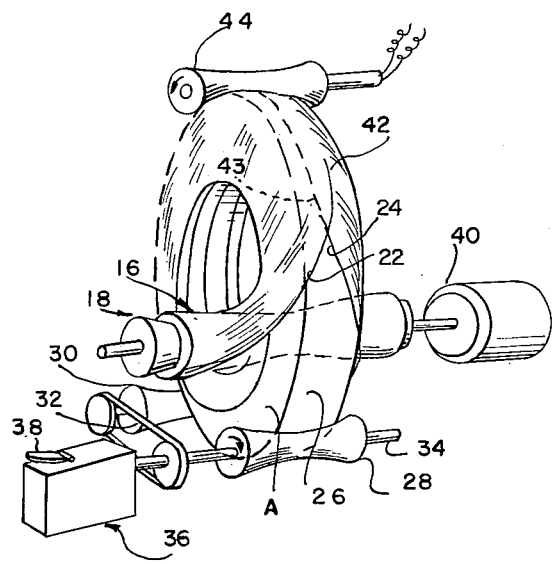
FIGURE 2 is a perspective view disclosing schematically an apparatus for applying the heat shrinkable material to an annular article such as a vehicle tire.

As shown in FIGURE 2, a tire 26 to be packaged may be supported vertically on a pair of driven rollers 28 and 30. As schematically shown in FIGURE 2, the rollers 30 are coupled together by a drive pulley 32 and a drive shaft 34 for roller 28 is suitably driven by a suitable source of power through a clutch mechanism generally indicated at 36. A foot pedal 38 for operating the clutch mechanism 36 may be controlled by the wrapper's foot to positively rotate the tire 26 in the direction of the arrow A as the tire is progressively wrapped.

The take-off roll 18, when filled with the selectively shrunk film 16, is rotatably supported through the center portion of the tire by any suitable means such as the fixture 40. The operator feeds the film 16 off of the roll 18 onto the tire so that the preshrunk longitudinal center portion 20 covers the bead portion of the tire. The unshrunk outer edge portions 22 and 24 are fed by hand over the side walls of the tire and overlap on the outer periphery of the tire as indicated at 42 and 43. A heat seal wheel 44, provided with a suitable heating element and cooperating with the tire and the overlap portions of the unshrunk longitudinal edges of film 16, is adapted by conduction to make a heat seal between the overlapped portions.

When the tire has been rotated slightly over 360° by the operator feeding the film 16 thereto, the operator can then cut the film from the roll 18 and remove the tire from the apparatus. The wrapped tire is then placed in a circulating hot air oven such as schematically shown at 46 in FIGURE 3. The hot air heats the package by convection and shrinkage of the unshrunk edge portions of the film results in the removing of any wrinkles which may have developed when the tire was wrapped. The heat on the heat seals of the package causes the heat seals to become less oriented and thus, the irradiated polyethylene is strengthened in the area of the seals.

Figure 3:
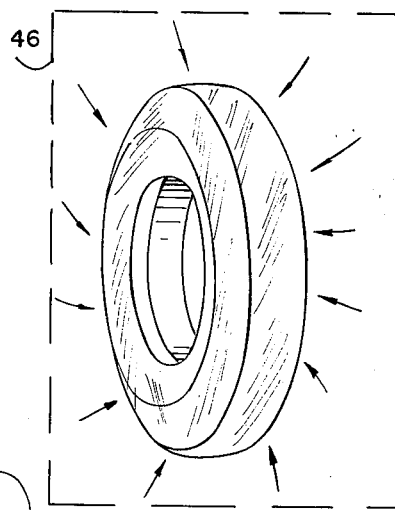
FIGURE 3 is a schematic perspective view representing a finished package tire placed in a circulating hot air oven.
Figure 9:
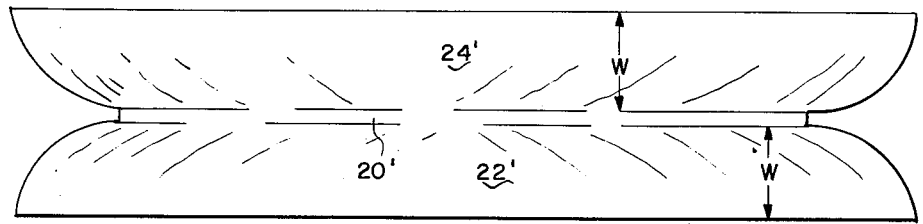
FIGURE 9 is a plan view of a piece of heat shrinkable film similar to that shown in FIGURE 4 but having unshrunk portions each capable of extending over one side wall portion, the peripheral outer portion and at least a part of the opposite side wall portion of an annular article.

While the method of packaging the tire has been described in connection with the apparatus disclosed in FIGURES 1, 2 and 3, it will be quite evident that the method may be practiced by other apparatus or by hand. In other words, the wrapper, utilizing a sheet of film having its longitudinal center portion preshrunk, may apply the sheet to the tire by cutting the sheet from the roll 18 in a desired length which is slightly greater than the outer circumference of the tire. The center portion of the sheet will have a length slightly greater than the circumference of the bead of the tire. The sheet may then be applied to the bead by placing the preshrunk portion 20 across the bead and then the unshrunk edge portions 22 and 24 may be wrapped over the side walls of the tire and overlapped on the tread or peripheral portion of the tire. The inherent adhesive characteristic of the heat shrinkable material may be used to preliminarily hold the overlapped portion of the wrapping together and then a suitable means may be used to provide a heat seal on the overlapped portions. After the tire has been wrapped in this manner, it may be placed in the circulating hot air oven 46 to shrink out any wrinkles in the covering as well as strengthen the heat seal. Rather than using a circulating hot air oven, any suitable means of applying heat may be used to accomplish the same results.

Referring now to FIGURE 4, the film 16 is shown as it would appear if layed out flat. The longitudinal edge portions 22 and 24 are unshrunk whereas the center longitudinal strip 20 has been shrunk along its longitudinal axis so that its length is slightly greater than the circumference of the bead of the tire. FIGURE 5 shows the tire 18 with the film for the cover positioned in the tire so that its shrunk portion 20 extends around and covers the bead portion whereas the unshrunk portions 22 and 24 are being folding over the side walls of the tire. In FIGURE 7, the cover is shown on the tire and it will be noted that the preshrunk portion 20 completely covers the bead portion of the tire.

In FIGURE 6, it will be noted that the preshrunk portion 20 overlaps as indicated at 50 and, of course, this portion may be heat sealed in any suitable manner so as to provide a complete seal for the cover. Likewise, as shown in FIGURE 8, there will be a certain amount of circumferential overlap on the periphery and side walls of the tire as indicated at 52 and, of course, this will also be provided with a heat seal.

By providing the selectively preshrunk longitudinal strip for wrapping the tire, it will now be apparent that a minimum of wrinkling occurs along the side wall of the package when the tire is wrapped as the preshrunk area does not necessitate a gathering of material in the bead area of the tire.

If it is desired, a tear strip having a greater tear strength than the film 16 may be provided between the overlapped portions 42 and 43 so that the wrapping may be quickly ripped from the tire.

Another advantage of the present invention is that the wrapping may be partially removed from the tire so that during the mounting of the tire onto the wheel the tire, particularly white walls, will be protected from grease and dirt. The wrapping is slit between the beads of the tire in the area 20 and the edges of the wrapper partially pealed back so that the tire can be handled and mounted without a wrapper interfering with the beads of the tire and the periphery of the wheel rim. A variation of this procedure was accomplished slitting the wrapper outside the bead on either sidewall of the tire so that the area of the longitudinal strip 20 could be completely removed and the beads of the tire exposed for mounting.

A modified method of covering annular shaped articles such as tires, toroidal coils, small machine parts and the like is shown in FIGURES 9 to 13 inclusive. The method contemplates covering an annular shaped article with a heat shrinkable film to make a package, the piece of heat shrinkable film 16' being substantially the same shape as the film 16 but having unshrunk side edge portions 22' and 24' each of which have a width W sufficient to cover one side wall of the article, the outer peripheral portion of the article and at least a portion of the opposite side wall. The film 16' is provided with a center portion 20' which is preshrunk along its longitudinal axis as heretofore described so that when the film 16' is used to cover an annular shaped article, the center preshrunk portion 20' circumferentially covers and extends across the inner peripheral portion of the article. The heat shrinkable film 16' may be made from any of the materials and by the processes heretofore referred to with respect to the film 16.

Figure 10:
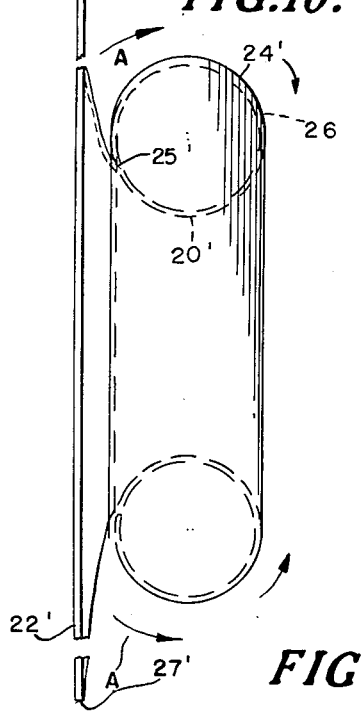
FIGURE 10 is an end elevational view showing the piece of film in FIGURE 9 positioned on the inner peripheral wall of an annular article and one of the unshrunk portions wrapped about one side wall, the outer peripheral portion and at least a portion of the other side wall of the article.

Referring now to FIGURE 10 it will be noted that the film 16' is shown applied to an article 26' and that the center portion 20' of the film covers the inner peripheral portion of the article. In FIGURE 10 one edge portion 24' is shown extending over one side wall of the article, the outer peripheral portion of the article and at least a portion of the opposite side wall of the article. The free edge of the portion 24' as indicated at 25', is positioned close or adjacent to the inner peripheral portion of the article. The opposite edge portion 22' is shown in a position just prior to being folded about a side wall, outer peripheral portion, and opposite side wall of the article 26'. The edge portion 22' will be folded in the direction of the arrow A.

Figure 11:
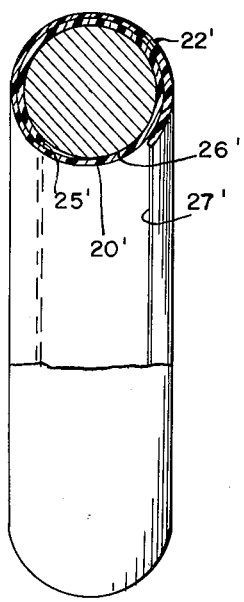
FIGURE 11 is a sectional view partly in elevation showing an annular article wrapped by the modified form film of FIGURE 9.

FIGURE 11 illustrates the film 16' as it will appear after it has been wrapped onto the article 26'. It will be noted that the edge portion 22' has its free edge 27' positioned closely adjacent to the inner peripheral wall of the article and thus there is overlapping of the edge portions 22' and 24' on the outer peripheral portion of the article as well as on a portion of each of the side walls of the article 26'.

Figure 12:
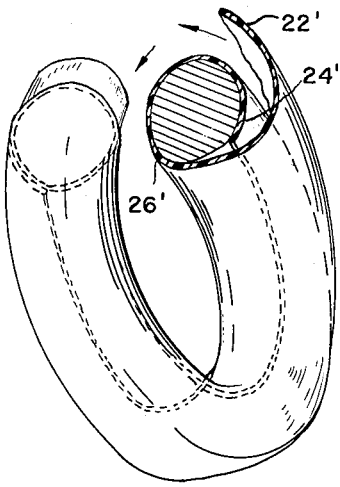
FIGURE 12 is a perspective view partly in section and more clearly showing the modified method of wrapping an annular shaped article.
Figure 13:
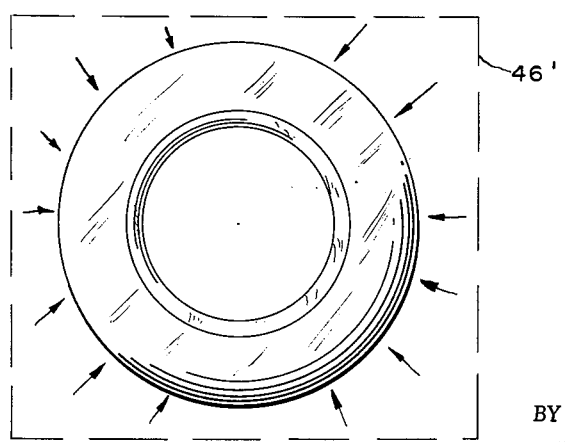
FIGURE 13 is a view similar to FIGURE 3 and schematically representing a finished package placed in a circulating hot air oven to shrink the unshrunk portions of the cover.

FIGURE 12 which is a perspective view partly in section, more clearly illustrates the overlapping of the unshrunk portions 22' and 24' on the article 26'.

After the article 26' has been covered in the above manner by the film 16', the resulting package is placed in a circulating hot air oven such as schematically shown at 46'. The hot air which is at a temperature less than the temperature necessary to plasticize the film 16' but is sufficient to shrink the unshrunk portions of the film cause the film to shrink and since the edge portions 22' and 24' extend inwardly with their free edges 25' and 27' to a position adjacent the inner peripheral portion of the article, the film will be tightly held on the article. By utilizing the method of making a package described immediately above and shown in FIGURES 9 to 13, the securing together of the overlapped unshrunk portions is accomplished by shrinkage of the material rather than by application of heat at a temperature sufficient to plasticize and fuse together the film. Thus in this form in the invention, the securing of the covering film 16' on the annular article as well as smoothing of film is accomplished by utilizing the shrink characteristics of the film.

In accomplishing the desired results that are set forth in the objects and advantages of the present invention, and as described in detail in the foregoing description, it will be perceived and obvious that the invention is susceptible to some changes and modifications, both as to the method and resulting article, without departing from the principle and spirit thereof. For this reason, the terminology used in the specification is for the purpose of description and not of limitation, the scope of the invention being defined in the claims.

What is claimed is:

1. A method of packaging an annular shaped article comprising the steps of: shrinking a longitudinal center strip of a piece of heat shrinkable film along its longitudinal center axis while the edge portions of the film remain unshrunk, applying the shrunk longitudinal portion of the film circumferentially of the inner peripheral portion of the article and then bringing the outer longitudinal unshrunk portions of the film over the article so that they overlap transversely and circumferentially on the outer peripheral portion of the article, and then securing together the overlap portions of the film.

2. A method as defined in claim 1 wherein the securing together of the overlap portions of the film is by applying heat to the overlap portions sufficient to cause the overlap portions to fuse together.

3. A method as defined in claim 2 including applying heat to the entire package thereby shrinking the unshrunk portions of the film into tight engagement with the article and reinforcing the heat seals.

4. A method as defined in claim 1 wherein said film is biaxially oriented irradiated polyethylene.

5. A method as defined in claim 1 wherein said film is biaxially oriented irradiated polyethylene having an integrated coating of a normally crystalline vinylidene chloride polymer.

6. A method as defined in claim 5 wherein said coating is a vinylidene chloride-acrylonitrile copolymer.

7. A method as defined in claim 1 wherein said film is normally crystalline vinylidene chloride polymer.

8. A method as defined in claim 7 wherein said normally crystalline vinylidene chloride polymer is vinylidene chloride-vinyl chloride copolymer.

9. A method of packaging an annular shaped article such as a tire or the like comprising the steps of: shrinking a longitudinal center strip of a piece of heat shrinkable film along its center longitudinal axis while the edge portions remain unshrunk, applying the shrunk longitudinal portion of the film circumferentially of and across the bead portion of the tire, folding each of outer unshrunk portions radially outwardly of the tire and over the respective side walls to a position where they cover and overlap each other on the peripheral portion of the tire, and then heat sealing the overlapped edge portions of the film.

10. A method as defined in claim 9 including applying heat to the film after the heat seals have been made so as to remove any wrinkles from the unshrunk portions of the film as well as to reinforce the heat seals.

11. A method as defined in claim 9 wherein the longitudinal center strip is shrunk in the order of ⅓ to ½ of its unshrunk length.

12. A method as defined in claim 9 wherein the longitudinal center strip is shrunk only along its longitudinal axis.

13. A method as defined in claim 9 wherein said shinking of said longitudinal strip is by convection of heat along the center longitudinal axis in a confined area.

14. A method as defined in claim 9 wherein said heat sealing of the overlapped portions of the film is by conduction.

15. A method as defined in claim 9 including applying heat to the film by convection after the heat seals have been made, thereby shrinking the unshrunk portions of the film and reinforcing the heat seals.

16. A method of packaging an annular shaped article such as a tire or the like comprising the steps of: shrinking the longitudinal center strip of a piece of heat shrinkable film along its center longitudinal axis while the edge portions remain unshrunk, rotatably supporting the tire to be shrunk, applying the shrunk longitudinal portion of the film circumferentially of and across the bead portion of the tire by rotating the tire on its axis and progressively folding each of the other unshrunk edge portions over the respective side walls of the tire and overlapping them on peripheral portion of the tire, and, progressively heat sealing by conduction the overlapped outer edge portions as the tire is rotated.

17. A method as defined in claim 16 including circulating a hot fluid over the package after the heat seals are made in order to shrink the unshrunk portions of the film so as to remove any wrinkles.

18. A method of packaging an annular shaped article comprising the steps of: utilizing a substantially rectangular piece of heat shrinkable film having a length greater than the outside periphery of the annular shaped article and a width greater than the periphery of a transverse section on a radius of the article, shrinking a longitudinal strip of the film along a center longitudinal axis while the edge portions remain unshrunk, applying the shrunk longitudinal strip over the inner peripheral portion of the article, then bringing the longitudinal unshrunk edge portions over the sides and outer peripheral portion of the article so that the edges overlap, and then securing the overlapped portion together.

19. In combination: an annular shaped article having inner and outer peripheral portions separated by side walls, a cover for said article made of a heat shrinkable film, said cover having a preshrunk longitudinal center strip for covering the inner peripheral portion of the article and longitudinal unshrunk edge portions for covering the respective side walls and overlapping on the outer peripheral portion of the article, and a heat seal securing the overlapping edge portion together.

20. The combination of claim 19 wherein said heat shrinkable film is biaxially oriented irradiated polyethylene.

21. The combination of claim 19 wherein said heat shrinkable film is biaxially oriented irradiated polyethylene having an integrated coating of a normally crystalline vinylidene chloride polymer.

22. The combination of claim 21 wherein said coating is vinylidene chloride-acrylonitrile copolymer.

23. The combination of claim 19 wherein said heat shrinkable film is a normally crystalline vinylidene chloride polymer.

24. The combination of claim 23 wherein said normally crystalline vinylidene chloride polymer is a vinylidene chloride-vinyl chloride copolymer.

25. The combination of claim 19 wherein said film is polypropylene.

26. A method of packaging an annular shaped article comprising the steps of: shrinking a longitudinal center strip of a piece of heat shrinkable polypropylene film along its longitudinal center axis while the edge portions of the film remain unshrunk, applying the shrunk longitudinal portion of the film circumferentially of the inner peripheral portion of the article and then bringing the outer longitudinal unshrunk portions of the film over the article so that they overlap transversely and circumferentially on the outer peripheral portion of the article, and then securing together the overlap portions of the film.

27. A method as defined in claim 1 wherein the securing together of the overlap portions of the film is accomplished by applying heat to the overlap portions at a temperature sufficient to cause shrinkage of the film.

28. A method of packaging an annular shaped article comprising the steps of: shrinking the longitudinal center strip of a piece of heat shrinkable film along its longitudinal center axis while the edge portions of the film remain unshrunk, applying the shrunk longitudinal portion of the film circumferentially of the inner peripheral portion of the article and then bringing each of the outer longitudinal unshrunk portions of the film over the article so that they overlap transversely and circumferentially on the outer peripheral portion of the article and extend inwardly over one side wall portion of the article to a point adjacent the inner peripheral portion of the article, and then applying heat to the unshrunk portions of the film thereby shrinking and holding the film on the article.

29. A method of packaging an annular shaped article comprising the steps of: shrinking a longitudinal center strip of a piece of heat shrinkable film along its center longitudinal axis while the edge portions remain shrunk, applying the unshrunk longitudinal portion of the film circumferentially of and across the inner peripheral portion of the article, folding each of the outer unshrunk portions of the film radially outwardly of the article over one side wall, the outer peripheral portion, and at least part of the opposite side wall of the article whereby the unshrunk portions overlap each other on the outer peripheral portion and at least a portion of each of the side walls of the article, and then subjecting the covered article to heat at a temperature below the temperature necessary to plasticize the film and at a temperature sufficient to shrink the unshrunk portions of the film to thereby shrink and hold the film on the article.

30. A method of packaging an annular shaped article comprising the steps of: shrinking a longitudinal center strip of a piece of heat shrinkable film along its center longitudinal axis while its edge portions remain unshrunk; applying the shrunk longitudinal portion of the film circumferentially of and across the inner peripheral portion of the article by relatively rotating the article with respect to the film, and progressively and successively folding each of the outer unshrunk portions over one side wall, the outer peripheral portion, and a portion of an opposite side wall; and then subjecting the covered article to heat a a temperature below the temperature necessary to plasticize the film and at a temperature sufficient to shrink the unshrunk portion of the film to thereby shrink and hold the film on the article.

31. In combination: an annular shaped article having inner and outer peripheral portions separated by side walls, a cover for said article made of a heat shrinkable film, said cover having a preshruink longitudinal center strip for covering the inner peripheral portion of the article and longitudinal unshrunk edge portions, each of said longitudinal unshrunk edge portions covering one side wall, the outer peripheral portion and at least a portion of the other side wall so that the unshrunk portions overlap on the outer peripheral portion of the article and a portion of both side walls, said unshrunk portions being subsequently shrunk to hold the cover on the article.

References Cited in the file of this patent

UNITED STATES PATENTS

| | | |
|---|---|---|
| 761,075 | Whitelegg et al. | Nov. 7, 1956 |
| 1,354,371 | Angier | Sept. 28, 1920 |
| 1,937,468 | Talbot | Nov. 28, 1933 |
| 2,603,838 | Lowry et al. | July 22, 1952 |
| 2,878,628 | Curry | Mar. 24, 1959 |

UNITED STATES PATENT OFFICE

CERTIFICATE OF CORRECTION

Patent No. 3,005,542 October 24, 1961

John W. Harrison

It is hereby certified that error appears in the above numbered patent requiring correction and that the said Letters Patent should read as corrected below.

Column 3, line 1, for "center" read -- tenter --; column 6, line 75, and column 7, line 1, for "shinking" read -- shrinking --; column 7, line 18, for "other" read -- outer --; column 8, line 24, for "shrunk" read -- unshrunk --; line 25, for "unshrunk" read -- shrunk --; line 49, for "a", first occurrence, read -- at --; same column 8, line 57, for "preshruink" read -- preshrunk --.

Signed and sealed this 3rd day of April 1962.

(SEAL)
Attest:

ERNEST W. SWIDER
Attesting Officer

DAVID L. LADD
Commissioner of Patents